United States Patent
Grasso et al.

(10) Patent No.: US 7,430,131 B2
(45) Date of Patent: Sep. 30, 2008

(54) START-UP CIRCUIT FOR PROVIDING A START-UP VOLTAGE TO AN APPLICATION CIRCUIT

(75) Inventors: Massimo Grasso, S. Martino S. (IT); Sergio Morini, Pavia (IT)

(73) Assignee: International Rectifier Corporation, El Segundo, CA (US)

( * ) Notice: Subject to any disclaimer, the term of this patent is extended or adjusted under 35 U.S.C. 154(b) by 318 days.

(21) Appl. No.: 11/199,841

(22) Filed: Aug. 9, 2005

(65) Prior Publication Data

US 2006/0033556 A1    Feb. 16, 2006

Related U.S. Application Data

(60) Provisional application No. 60/600,046, filed on Aug. 9, 2004.

(51) Int. Cl.
    *H02M 1/00* (2007.01)
(52) U.S. Cl. .............................. 363/49; 363/50; 363/226
(58) Field of Classification Search ................. 323/282, 323/229, 266, 311, 901; 363/49, 50, 226
    See application file for complete search history.

(56) References Cited

U.S. PATENT DOCUMENTS

| | | | |
|---|---|---|---|
| 5,014,178 A | * | 5/1991 | Balakrishnan ................ 363/49 |
| 5,285,369 A | * | 2/1994 | Balakrishnan ................ 363/49 |
| 5,477,175 A | * | 12/1995 | Tisinger et al. ............. 327/143 |
| 5,640,317 A | * | 6/1997 | Lei .............................. 363/49 |
| 5,815,383 A | | 9/1998 | Lei |
| 5,953,219 A | * | 9/1999 | Matsumoto .............. 363/21.16 |
| 6,043,636 A | * | 3/2000 | Gaudreau et al. ........... 323/282 |
| 6,535,405 B2 | * | 3/2003 | Chen ........................... 363/65 |
| 6,549,430 B1 | | 4/2003 | Hosotani et al. |

(Continued)

FOREIGN PATENT DOCUMENTS

DE    100 21 643 A1    11/2000

(Continued)

OTHER PUBLICATIONS

Communication dated Jun. 5, 2007 in corresponding German Patent Application No. 10 2005 037 409.3-32.

(Continued)

*Primary Examiner*—Matthew V Nguyen
*Assistant Examiner*—Nguyen Tran
(74) *Attorney, Agent, or Firm*—Ostrolenk, Faber, Gerb & Soffen, LLP

(57) ABSTRACT

A startup circuit for providing a startup voltage from a high voltage DC bus voltage to an application circuit including an integrated circuit package for at least a control circuit for driving at least one power switch of the application circuit; a dropping resistor in the integrated circuit package having a first terminal for coupling to the high voltage DC bus and for dropping the high voltage DC bus voltage to a reduced voltage level at a second terminal; and a low voltage regulator in the package coupled to the second terminal for providing a startup regulated low voltage DC output at a preset level for powering at least one part of the application circuit during startup of the application circuit. The application circuit may be, for example, a switching mode power supply.

12 Claims, 1 Drawing Sheet

U.S. PATENT DOCUMENTS

Figure 1:
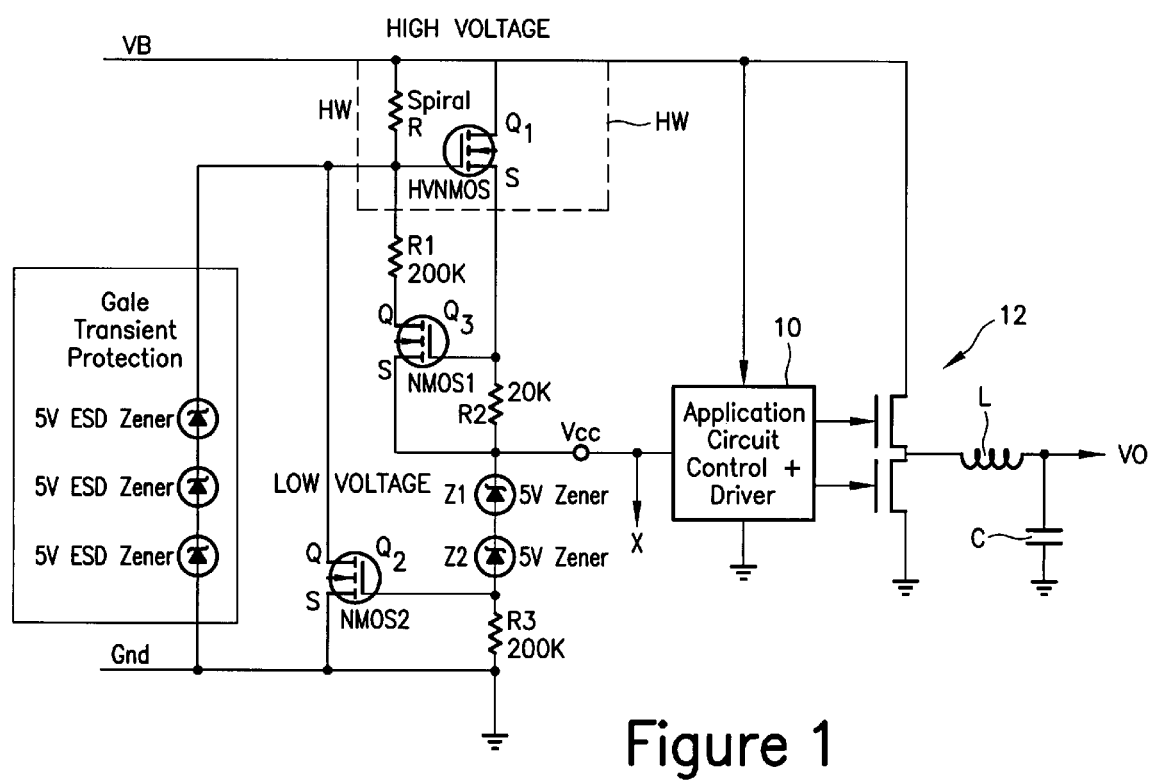

2003/0117825 A1 6/2003 Liaw et al.
2004/0046225 A1 3/2004 Feiler

FOREIGN PATENT DOCUMENTS

| JP | 48-18623 | 6/1973 |
| JP | 03-25917 | 3/1991 |
| JP | 08-308225 | 11/1996 |
| JP | 2003-530645 | 10/2003 |
| JP | 2003/533886 | 11/2003 |
| WO | WO 01/78222 A1 | 10/2001 |
| WO | WO 2004/010569 | 1/2004 |

OTHER PUBLICATIONS

Office Action dated Apr. 8, 2008 in corresponding Japanese Patent Application No. 2005-230507 with English language translation.

* cited by examiner

START-UP CIRCUIT FOR PROVIDING A START-UP VOLTAGE TO AN APPLICATION CIRCUIT

CROSS-REFERENCE TO RELATED APPLICATIONS

The present application claims the benefit and priority of U.S. Provisional Application No. 60/600,046 filed Aug. 9, 2004 and entitled START-UP RESISTOR FOR HIGH VOLTAGE SWITCHING REGULATOR, the entire disclosure of which is hereby incorporated by reference.

BACKGROUND OF THE INVENTION

The present invention relates to a start-up circuit for providing a start-up voltage from a high voltage DC bus to a high voltage application circuit, for example, wherein the application circuit may comprise a switching regulator circuit coupled to a high voltage DC bus.

In the past, start-up circuits comprising external resistors are provided to application circuits wherein the application circuit comprises an integrated circuit. It is desirable to be able to eliminate the external resistor. However, this has been difficult to achieve in the past due to the high voltage. Further, it is also desirable to provide a start-up circuit which has an automatic shutoff feature which shuts down the start-up circuit when the voltage regulator output is sensed, i.e., when the voltage regulator output is generated by the voltage regulator circuit. In this way, maximum power dissipation is confined to a small time interval during start-up.

Further, it is desirable to be able to provide overcurrent protection that limits power dissipation in the start-up circuit in the event of an output short or overload condition.

As described previously, in the past, such start-up supplies were provided through an external resistor which increases cost and further which does not have the automatic shutoff capability nor overcurrent protection.

The main purpose of this circuit is to supply a switching voltage regulator with power upon start-up from a high voltage DC bus before the regulator can self-supply. A typical DC bus voltage may be approximately 600 volts, for example.

SUMMARY OF THE INVENTION

The invention provides a number of advantages. A dropping resistor is incorporated in the integrated circuit package for the controller of the application circuit, for example a switching regulator or the control and drive circuit of a switch regulator output circuit.

In addition, an automatic shutoff feature which shuts down the circuit when the voltage regulator output is provided. In this way, maximum power dissipation is confined to a small time interval during start-up.

Furthermore, an overcurrent protection circuit that limits power dissipation in the circuit in an output short or overload condition is provided.

According to the invention, the above objects are achieved by a startup circuit for providing a startup voltage from a high voltage DC bus voltage to an application circuit comprising an integrated circuit package for at least a control circuit for driving at least one power switch of the application circuit; a dropping resistor in the integrated circuit package having a first terminal for coupling to the high voltage DC bus and for dropping the high voltage DC bus voltage to a reduced voltage level at a second terminal; further comprising a low voltage regulator in the package coupled to the second terminal for providing a startup regulated low voltage DC output at a preset level for powering at least one part of the application circuit during startup of the application circuit.

BRIEF DESCRIPTION OF THE DRAWING(S)

The invention will now be described in greater detail in the following detailed description with reference to the drawings in which FIG. 1 shows the start-up circuit according to the present invention.

Other objects, features and advantages of the present invention will be apparent from the detailed description which follows.

DETAILED DESCRIPTION OF PREFERRED EMBODIMENTS OF THE INVENTION

Turning now to the drawings, FIG. 1 shows the start-up circuit according to the present invention. The start-up circuit comprises, illustratively, an NMOS start-up circuit showing the high and low voltage parts of the circuit. The high voltage section is contained within a high voltage well HW. The border of the high voltage well HW has a polysilicon resistor (spiral R) which may be a spiral shaped polyresistor which is used to shape the electric field. One terminal of the polyresistance is in the high voltage well and is connected to the high voltage DC bus VB. The other terminal is in the low voltage side and is connected to the gate of the high voltage NMOS Q1. The value of the resistor spiral R is in the tens of megohms. It serves to turn on the high voltage transistor Q1.

As shown in FIG. 1, the application circuit 10 is provided with voltage from the high voltage bus. The application circuit may be a switching mode power supply or the control and drive portion for the output stage 12 of a switching mode power supply (SMPS), shown illustratively as a synchronous buck converter output stage, although the SMPS can be any other type of SMPS, such as a boost converter, back-boost, flyback forward converter, etc. According to the invention, the application circuit 10 is typically contained within the square package (IC package) as the start-up circuit. Before the application circuit, which may comprise a switching regulator, can self regulate to apply the output voltage V0, it is provided with the start-up voltage VCC by the start-up circuit shown. Once the application circuit begins to supply the regulated output voltage, the high voltage start-up circuit is shut off.

The start-up circuit shown can also be used as a very low current power supply X for circuits such as comparators, for example, drawing small currents, for example, tens of microamps at about 12 volts. The VCC point is maintained at about 12 volts in the illustrated embodiment by the current flowing in the branch with the zener diode, shown illustratively as two zener diodes Z1 and Z2. In the illustrated embodiment each zener diode has an avalanche voltage of 5 volts for a total of 10 volts avalanche voltage. The voltage drop across these zeners plus the voltage drop across resistor R3 add to make VCC. This gives about 10 volts plus the threshold of Q2 (about 1.5 volts) for VCC.

This start-up circuit regulates VCC through a feedback mechanism as follows. If the voltage at VCC increases for some reason above its steady state value, this causes the voltage across R3 to increase causing Q2 to turn on more heavily, which then causes the gate node voltage of Q1 to decrease. This decrease in gate voltage decreases the drain current of Q1 which then closes the feedback loop by causing a decrease in the voltage of VCC which initially increased. The opposite situation results if the change in VCC is opposite, i.e., if VCC decreases.

In the desired operation, the output is taken from the point labeled VCC. As mentioned above, the output voltage is about 12 volts in the illustrated embodiment. This voltage is only needed momentarily while the application circuit is starting up. Once the application starts up it is desirable to turn off the start-up circuit to save power. After supplying and powering up the application circuit, for example, a switched mode power supply, Q2 senses the power supply output at VCC and provides the shutoff function of the circuit by sensing the voltage across R3. The higher voltage at VCC and hence across R3 will turn on Q2 more ($V_T$ approximately 1.5 volts) and will decrease the gate drive of the supplying transistor Q1. After the shutoff, the symmetrical device Q3 has its drain connected to ground and its gate/source to VCC. This causes Q3 to turn on with the source and drain interchanged. Then, R1 in the interchanged source circuit of Q3 limits the power dissipation during the shutoff operation.

The circuit also provides short circuit protection. If VCC were to be shorted or overloaded, all that portion of the circuit below the VCC point would be eliminated and the source of Q1 would be connected to ground through resistor R2, which may be, for example, 20 K ohms. This will cause too much power dissipation from VB without a current limit. In this case, Q3 senses a greater voltage drop across R2 in the short circuit operation and turns on, bringing down the gate voltage of Q1, limiting the maximum current.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A startup circuit for providing a startup voltage from a high voltage DC bus voltage to an application circuit, the startup circuit comprising:
    an integrated circuit package for at least a control circuit for driving at least one power switch of the application circuit having a low voltage terminal;
    a dropping resistor in the integrated circuit package having a first terminal for coupling to the high voltage DC bus and a second terminal, the dropping resistor dropping the high voltage DC bus voltage to a reduced voltage and providing the reduced voltage at the second terminal;
    a low voltage regulator coupled to the second terminal for using the reduced voltage for enabling generation of a regulated startup low voltage DC output at a preset level at the low voltage terminal for powering at least one part of the application circuit during startup of the application circuit,
    wherein the high voltage DC bus voltage is the only voltage source provided externally to the integrated circuit package and wherein the low voltage regulator comprises
    a first high voltage switch in series circuit with a first resistance, the series circuit coupled between said first terminal and said low voltage terminal;
    a second switch coupled between said second terminal and a terminal having a reference potential and having a control electrode coupled to a voltage sensor sensing said low voltage DC output;
    a voltage reference source for setting the low voltage DC output; said voltage reference source and voltage sensor being coupled in series between said low voltage DC output and said terminal having said reference potential;
    whereby when said low voltage DC output at the low voltage terminal changes from the preset level, conduction through said second switch changes, thereby changing the voltage at the control electrode of the first high voltage switch to drive the low voltage DC output back to the preset level.

2. The startup circuit of claim 1, wherein if the low voltage DC output increases from the preset level, a voltage across said voltage sensor increases, causing said second switch to increase its conduction of current, thereby reducing the voltage at the control electrode of said first high voltage switch, thereby decreasing the current in said first high voltage switch and reducing the low voltage DC output to the preset level.

3. The startup circuit of claim 2, wherein if the low voltage DC output decreases from the preset level, a voltage across said voltage sensor decreases, causing said second switch to decrease its conduction of current, thereby increasing the voltage at the control electrode of said first high voltage switch, thereby increasing the current in said first high voltage switch and increasing the low voltage DC output to the preset level.

4. The startup circuit of claim 1, wherein said second switch senses said low voltage DC output via said voltage sensor, so that, when said low voltage DC output is present after startup is higher than the preset level, said second switch will increase its conduction of current to decrease the voltage at the control electrode of the first high voltage switch such that the first high voltage switch turns off.

5. The startup circuit of claim 4 further comprising a third switch in series with a series resistance coupled between said second terminal and said low voltage terminal for limiting power dissipation in said second switch when said first high voltage switch is turned off.

6. The startup circuit of claim 5, wherein said third switch has a control electrode coupled to said low voltage terminal through said first resistance whereby, when said second switch turns on when the output of the switching regulator circuit is present after startup on the low voltage DC output, said third switch turns on so that current flows through said series resistance.

7. The startup circuit of claim 6, wherein said third switch comprises a symmetrical MOSFET, whereby, when said third switch turns on, the source and drain of the third switch interchange.

8. The startup circuit of claim 5, wherein said third switch senses a voltage across said first resistance, whereby, if said voltage across said first resistance indicates a short circuit condition at said low voltage terminal, said third switch operates to limit the current in said first high voltage switch to a preset safe level.

9. The startup circuit of claim 8, wherein, if the voltage across said first resistance indicates a short circuit condition at said low voltage terminal, said third switch turns on, reducing the voltage at said control electrode of said first switch, thereby limiting the current in said first high voltage switch to a preset safe level.

10. The startup circuit of claim 1, wherein the voltage reference source comprises at least one Zener diode.

11. The startup circuit of claim 5, wherein said first high voltage, second and third switches comprise MOFSETs.

12. The startup circuit of claim 1, further comprising a transient protection circuit coupled to the control electrode of said first high voltage switch.

* * * * *